United States Patent
Dubbleman et al.

(10) Patent No.: US 10,477,885 B2
(45) Date of Patent: Nov. 19, 2019

(54) TOMATO-DERIVED THICKENING AGENT

(71) Applicant: Conopco, Inc., Englewood Cliffs, NJ (US)

(72) Inventors: Sander Dubbleman, Vlaardingen (NL); Nikolaos Mavroudis, Newcastle-upon-Tyne (GB); Leandro Oliehoek, Valinhos (BR)

(73) Assignee: Conopco Inc., Englewood Cliffs, NJ (US)

( * ) Notice: Subject to any disclaimer, the term of this patent is extended or adjusted under 35 U.S.C. 154(b) by 801 days.

(21) Appl. No.: 14/880,826

(22) Filed: Oct. 12, 2015

(65) Prior Publication Data

US 2016/0029671 A1 Feb. 4, 2016

Related U.S. Application Data

(62) Division of application No. 13/643,224, filed as application No. PCT/EP2011/056150 on Apr. 18, 2011, now abandoned.

(51) Int. Cl.
| | | |
|---|---|---|
| *A23L 19/00* | (2016.01) | |
| *A23L 29/20* | (2016.01) | |
| *A23L 29/206* | (2016.01) | |
| *A23L 29/231* | (2016.01) | |
| *A23L 27/60* | (2016.01) | |

(52) U.S. Cl.
CPC .............. *A23L 29/20* (2016.08); *A23L 19/09* (2016.08); *A23L 27/63* (2016.08); *A23L 29/206* (2016.08); *A23L 29/231* (2016.08); *A23V 2002/00* (2013.01)

(58) Field of Classification Search
CPC ........ A23L 19/09; A23L 27/63; A23L 29/231; A23L 29/206; A23L 29/20
See application file for complete search history.

(56) References Cited

FOREIGN PATENT DOCUMENTS

WO WO-2009080768 A2 * 7/2009 ............. A23L 19/09

* cited by examiner

*Primary Examiner* — Walter A Moore
(74) *Attorney, Agent, or Firm* — N.V. Nederlandsch Octrooibureau; Catherine A. Shultz; Tamara C. Stegmann

(57) ABSTRACT

The present invention provides a tomato-derived thickening agent, said agent being characterized in that, on a dry weight basis, it contains: 0.1-3 wt. % of lycopene; 14-34 wt. % of protein; 11-35 wt. % of pectin; 17-39 wt. % of sugars selected from fructose, glucose, and combinations thereof. The invention further relates to a process for preparing a tomato-derived thickening agent and to the use of such a thickening agent in food products such as tomato ketchup, tomato-based sauces, pizza sauce, tomato soup and tomato juice.

9 Claims, No Drawings

TOMATO-DERIVED THICKENING AGENT

RELATED APPLICATIONS

This application is a divisional of U.S. patent application Ser. No. 13/643,224, filed Dec. 20, 2012, which is a national phase filing under 35 U.S.C. 371 of PCT International Application No. PCT/EP2011/056150, filed Apr. 18, 2011, which are incorporated herein by reference in their entirety.

FIELD OF THE INVENTION

The present invention relates to a tomato-derived thickening agent and to the use of such an agent in aqueous food products, especially tomato-based products such as ketchup, tomato based sauces and tomato juice. The invention also provides a method for the preparation of a thickening agent from tomato pulp.

BACKGROUND OF THE INVENTION

Tomato-based products such as tomato ketchups, barbecue sauces, pizza sauces and other similar condiments are typically made from tomato pastes, tomato purees, tomato juices or similar compositions that contain substantial amounts of tomato solids. These tomato solids include water-insoluble tomato particles, including tomato seeds and portions of tomato skins; tomato fibres which comprise the bulk of tomato fruit; and pectin. Each of these components affects the stability, appearance, flavour and sensory appeal of tomato-based food products.

For example, the carotene lycopene that gives tomato sauce its characteristic red colour is found primarily in chromoplasts within the tomato pulp and tomato fibre. Hence, the amount and distribution of the pulp and fibre will determine whether the tomato sauce will have an overall, even desirable colour. In addition, the size and distribution of the tomato pulp particles may also affect the texture of such tomato-based products. Large, unevenly distributed pulp particles will tend to produce a lumpy product, while extremely finely divided pulp particles will tend to produce a smooth textured product.

Similarly, the tomato fibres tend to link together and intertwine to form a lattice network or fibrous matrix that provides body and viscosity to tomato-based products and further traps free liquid which would otherwise "weep", i.e. separate, from the product. The liquid typically consists primarily of water and may also include other tomato fluids, and additives to the product. When present in sufficient concentrations, the pectin in tomato-based products forms a gel that also acts to bind free liquid in the products and to increase the products' viscosity.

http://all-creatures.org/recipes/i-tomatopaste.html discloses a standard canned tomato paste prepared by cooking tomatoes until a concentrate with 73.5 wt % water content is obtained, containing (calculated on dry weight) 16.3 wt. % protein, 37.4 wt. % glucose and fructose taken together, 0.11 wt % lycopene and 17 wt. % dietary fiber.

It is known to modify the physical properties of the tomato solids in tomato sauces and slurries using various techniques, including homogenisation of the products. Homogenisation is employed to finely divide, break down and disperse pulp particles throughout a slurry to produce products with acceptable colour and texture. Tomato pulp contributes many relatively spherical particles, which are insoluble in water and which must be reduced in size and uniformly dispersed throughout the product. If this is not done, a product with an excessively rough texture will result. Furthermore, since the carotene pigment (lycopene) is contained in these particles of pulp and fibre, failure to properly disperse them will result in a product with poor uniformity and depth of colour.

In addition to the above particles, tomato dispersions have a very high content of fibrous strands. Through proper processing techniques, these fibres form a structure that is responsible for the viscosity of the product and for its ability to retain free water. Homogenisation can cause fibrillation of the fibre ends without a significant reduction in fibre length. This results in fibres having ends similar in appearance to the ends of a frayed rope. The fibrillated fibre will absorb and retain water in the manner of a wick. The obvious result is increased product viscosity and reduced syneresis.

However, the process does have limitations. If too high a homogenizing pressure is used, then the fibre network will be broken down. Although the greater number of individual fibres will absorb more water and cause a greater viscosity increase, any remaining free water will quickly separate because the structure which bound this water will have been destroyed. In short, the price for greater viscosity increases is an increase in serum separation. In practice, processing conditions are chosen on the basis of a compromise between these two opposing effects.

A component that plays an important role in the preparation of tomato dispersions is pectin. This naturally occurring polysaccharide increases product viscosity and reduces separation by tying up any remaining free water. Homogenization increases both of these effects by aiding in the complete and uniform solubilisation of the pectin.

Obviously, the preparation of tomato products is very much subject to variations in the structure and chemistry of the tomatoes used. This, in turn, is dependent upon such growing factors as: geographical location, climate conditions, weather variations, soil conditions, growing season and variety of tomato. There is no way to eliminate the influence of such factors. However, adjustments in homogenising conditions may be required to compensate for unwanted characteristics in the final product resulting from these factors. This type of precise control over the physical characteristics of the finished product is very important in maintaining a degree of consistency from batch to batch.

Alternative processing steps have been used to supplement the effects of homogenisation, including the additional steps of milling the products or using of vacuum expansion chambers to increase viscosity and improve the colour of the products.

Despite the efforts that have been made to optimise the stability, appearance, flavour and sensory appeal of tomato-based food products by manipulating the processing conditions that are employed in the manufacture of these products, it is common practice to employ additives, notably calcium chloride and/or viscosifiers, to further improve stability and texture of tomato-based products. In the tomato processing industry calcium chloride is frequently added to tomato products to increase their viscosity and to prevent syneresis. The calcium ions react with free carboxyl groups of tomato pectin to produce a gel network of calcium pectate. Viscosifiers such a natural gums, starch, pectin, guar gum, xanthan gum and CMC are also widely used to increase the viscosity of and/or to prevent syneresis in tomato-based products such as ketchup. From a consumer perspective, the use of such additives in tomato products, notably the use of additives that are foreign to tomatoes, is undesirable.

Farahnakyi et al., Journal of Texture Studies, vol. 39. (2007), pp. 169-182 describe a method for preparing a thickening agent, involving drying tomato waste ("pomace", mainly including tomato seeds and skins) to a moisture content of about 7%, followed by milling and sieving. This results in a tomato pomace powder comprising (on dry matter) 24.8 wt % protein, 0.08 wt % lycopene, 13.8/14.5 wt % reducing sugars/total sugars and 41.1 wt % fibers.

U.S. Pat. No. 6,413,560 describes a method for preparing a pectin-containing food, said method comprising treating a food mass with pectin esterase under conditions which result in (i) a reduction in syneresis of said treated mass relative to an untreated mass; (ii) an increase in viscosity of said treated mass relative to an untreated mass; and (iii) a lack of pectin depolymerisation. Tomato juice, tomato slurry, tomato paste, salsa and ketchup are mentioned as examples of pectin-containing foods. Example 1 describes the preparation of a ketchup products from a diluted hot break tomato paste (8.5% VSS) that has been homogenised at 300 bar. The homogenized material was treated with different amounts of pectin esterase, followed by addition of brine, sugar, salt and acetic acid. The ketchup products so obtained were heated to 88° C. for 3 minutes and subsequently cooled in an ice bath. The results indicate that syneresis and viscosity can be controlled by adjusting the concentration of pectin esterase.

U.S. Pat. No. 7,166,315 describes a composition comprising dietary fibres with high water holding capacity (WHC) that is obtained from tomato pulp. The composition can be used as a texturing, bulking, viscosity controlling or syneresis-preventing agent for food. The US patent further describes a process for preparing the aforementioned composition comprising:
1) pre-treating tomatoes by conventional unit operations which comprise washing, sorting and crushing,
2) separating the peel and seeds of the tomato from the crushed tomatoes,
3) subjecting the crushed tomatoes to heat treatment (80-110° C.),
4) separating the crushed tomatoes into serum and pulp by centrifugation, to obtain fine pulp,
5) extracting carotenoids and lipids from the fine pulp obtained in step 4, and
6) drying the extracted fine pulp obtained in step 5;
and wherein the peels and seeds of the tomato are separated from the crushed tomatoes at any stage before said extracting and drying. Following the separation stage, carotenoids and lipids are extracted from the fine pulp to obtain, after solvent removal, tomato fibres substantially free of lipids, carotenoids, seeds and peels The solvent may then be removed by azeotropic distillation.

From a consumer perspective both the use of enzymes and organic solvents as advocated in the above referenced US patents are equally undesirable as the use of additives described herein before. Hence, there is a need for alternative techniques that enable the industrial production of high quality tomato-based products, but that do not employ additives, enzymes or organic solvents. More particularly, there is a need for a "friendly label" agent that can be applied in tomato-based products to increase viscosity and/or to prevent syneresis.

SUMMARY OF THE INVENTION

The inventors have successfully addressed the aforementioned challenge and developed a tomato-derived thickening agent that can advantageously be employed in tomato-based products as well as in other aqueous food products. This tomato-derived thickening agent can be isolated from tomato pulp using not more than two basic physical separation steps. The thickening agent of the present invention is a natural product that can be 100% tomato derived and that can suitably be used to increase the viscosity of aqueous food products. If applied in sufficiently high concentration, the present thickening agent may even be employed as a gelling agent.

The tomato-derived thickening agent according to the present invention contains, on a dry weight basis:
0.1-3 wt. % of lycopene;
14-34 wt. % of protein;
11-35 wt. % of pectin;
17-39 wt. % of sugars selected from fructose, glucose, and combinations thereof.

The thickening agent of the present invention is a particularly effective and versatile thickening agent. The unique thickening properties of the present thickening agent are only in part attributable to the pectin contained therein.

The present invention also provides a process for preparing a tomato-derived thickening agent, said process comprising the steps of:
providing a tomato pulp containing 3-15 wt. % tomato soluble solids (TSS) and 0.3-5 wt. % tomato insoluble solids (TIS);
isolating from said tomato pulp a tomato serum fraction having a reduced TIS content of less than 2.0 wt. % and a TSS content of at least 3 wt. %;
subjecting said tomato serum fraction to a filtration step to produce a retentate and a filtrate, said filtration step employing a membrane with a Molecular Weight Cut Off (MWCO) in the range of 10-20,000 kDa;
collecting the retentate; and
optionally drying the retentate.

The present process offers the important advantage that it can be operated using basic separation techniques such as centrifugation and filtration.

The present invention further provides a method of preparing a food product having a water content of at least 40 wt. %, said process comprising the step of incorporating 0.01-20% of the above described tomato-derived thickening agent in the food product.

DETAILED DESCRIPTION OF THE INVENTION

Accordingly, one aspect of the invention relates to a tomato-derived thickening agent, said agent being characterized in that, on a dry weight basis, it contains:
0.1-3 wt. %, preferably 0.2-1.5 wt. % of lycopene;
14-34 wt. %, preferably 18-30 wt. % of protein;
11-35 wt. %, preferably 15-28 wt. % of pectin;
17-39 wt. %, preferably 20-35 wt. % of sugars selected from fructose, glucose, and combinations thereof.

Besides lycopene, protein, pectin and sugars, the thickening agent may contain other components, typically in a concentration of up to 40% by weight of dry matter. Even more preferably, these other components are contained in the agent in a concentration of 12.9-34%, most preferably of 20-32% by weight of dry matter. The "other components" that are contained in the present thickening agent may be water soluble or water insoluble. Examples of such other components include (insoluble and soluble) fibres, minerals (e.g. magnesium, phosphorus and potassium) and acids (e.g. citric acid and amino acids). According to a particularly preferred embodiment, the other components are all originate from tomato, i.e. they are tomato components.

As explained herein before the present invention offers the advantage that it enables the manufacture of a thickening agent that is 100% tomato derived. Thus, the thickening agent, when applied in food products, can be labelled as e.g. "tomato extract". As used herein the terminology "100% tomato derived" means that the thickening agent does not include any added components, other than water, that are not derived from tomato. Thus, a thickening agent that is 100% tomato derived does not contain traces of organic extraction solvents.

The thickening agent of the present invention typically contains a mixture of monosaccharides. Typically, the thickening agent contains, on a dry weight basis:
- 6-20 wt. %, preferably 8-17 wt. %, more preferably 10-15 wt. % of fructose;
- 6-20 wt. %, preferably 8-18 wt. %, more preferably 10-16 wt. % of glucose.

Fructose and glucose are typically contained in the thickening agent in a weight ratio of 1:2 to 2:1; preferably in a weight ratio of 3:4 to 2:1.

According to a particularly preferred embodiment, the protein contained in the thickening agent is tomato protein. Likewise, it is preferred that the pectin contained in the agent is tomato pectin.

The unique properties of the present thickening agent are believed to be associated with the presence of high amounts of pectin and protein. Preferably, the combination of protein and pectin constitutes least 32 wt. %, more preferably at least 34 wt. % of the dry matter contained in the thickening agent. A suitable procedure for determining the pectin concentration in tomato-based products is described herein.

Preferably, the thickening agent contains at least 25%, more preferably at least 30% and most preferably at least 35% of pectin by weight of dietary fibre. Insoluble dietary fibre typically represents not more than 75%, more preferably not more than 70% and most preferably not more than 65% by weight of the dietary fibre contained in the thickening agent.

The thickening agent of the present invention typically contains at least 20 wt. %, more preferably at least 50 wt. % of tomato insoluble solids (TIS) by weight of dry matter.

Advantageously, the thickening agent is substantially free from insoluble particles having a diameter in excess of 100 μm. Accordingly, in a particularly preferred embodiment 50 wt. % of the insoluble particles present in the thickening agent has a diameter of less than 50 μm, more preferably less than 35 μm and most preferably less than 25 μm.

The thickening agent of the present invention can suitably be provided in the form of, for example, a powder (e.g. a granulate), a paste or a liquid. Advantageously, the thickening agent is a free flowing powder. Such a free flowing powder preferably has a mass weighted average diameter in the range of 10-300 μm, more preferably in the range of 15-150 μm.

Another aspect of the present invention relates to a process for preparing a tomato-derived thickening agent, said process comprising the steps of
a) providing a tomato pulp containing 3-15 wt. % tomato soluble solids (TSS) and 0.3-5 wt. % tomato insoluble solids (TIS);
b) isolating from said tomato pulp a tomato serum fraction having a reduced TIS content of less than 2.0 wt. % and a TSS content of at least 3 wt. %;
c) subjecting said tomato serum fraction to a filtration step to produce a retentate and a filtrate, said filtration step employing a membrane with an MWCO (Molecular Weight Cut Off) in the range of 10-20,000 kDa;
d) collecting the retentate; and
e) optionally drying the retentate.

The term "tomato pulp" as used herein broadly refers to an aqueous suspension that contains both dissolved and non-dissolved tomato solids The term "tomato soluble solids" or "TSS" as used herein refers to the concentration of tomato soluble solids calculated on total product. TSS is determined by using the procedure for measuring natural tomato soluble solids (NTSS) as defined by the United States Department of Agriculture (USDA), except that the TSS concentration is calculated on the total product (including insoluble solids), whereas NTSS is calculated only on the combined amount of water and soluble solids. The procedure for determining NTSS is described later.

The term "tomato insoluble solids" or "TIS" as used herein refers to the concentration of tomato insoluble solids calculated on total product. The sum of TSS and TIS equals the concentration of tomato solids calculated on total product.

The aforementioned process is ideally suited for producing a tomato-derived thickening agent as defined herein before. The retentate can be employed as a thickening agent as such, or it may be dehydrated, e.g. by spray drying, before being employed as a thickening agent.

The tomato pulp that is employed as a starting material in the present process may suitably contain one or more of tomato materials selected from tomato paste, tomato puree, tomato juice. In order to obtain an adequate yield, the TSS and TIS content should, if necessary, be adjusted to the levels specified herein before. According to a particularly preferred embodiment, the present process employs as a starting material a tomato pulp that has been obtained by diluting tomato paste and/or tomato puree with water.

The weight ratio TSS:TIS in the tomato serum preferably is a least 20:1, more preferably at least 30:1 and most preferably at least 40:1. Typically, the latter ratio does not exceed 60:1, most preferably it does not exceed 50:1.

The weight ratio TSS:TIS in the tomato serum fraction that is isolated from the tomato pulp is typically at least 5 times higher than the same ratio in the tomato pulp feed. Even more preferably, said ratio is at least 7 times higher, most preferably at least 10 times higher in the serum fraction than in the tomato pulp.

The TIS content of the serum fraction is typically at least 5 times lower, more preferably 10 times lower than that of the tomato pulp feed. In contrast, the TSS content of the serum fraction is preferably comparable to the TSS content of the tomato feed, more preferably higher than the TSS content of the tomato feed. Accordingly, the TSS content of the serum fraction preferably is at least 50%, more preferably at least 70% of the TSS content of the tomato pulp feed.

The TIS content of the serum fraction is preferably 0.1-1.5 wt. %, most preferably 0.2-1.0 wt. %. The TSS content of the serum fraction preferably exceeds 5 wt. %. Even more preferably the TSS content of the serum fraction lies within the range of 7-10 wt. %.

In the present process the tomato serum fraction is preferably isolated from the tomato pulp by means of physical solid-liquid separation techniques. Even more preferably, the tomato serum fraction is isolated from the tomato pulp by means of a solid-liquid separation technique selected from centrifugation, decanting, sieving, filtration and combinations thereof. Most preferably, the serum fraction is isolated from the pulp by means of decanting or centrifugation. In order to isolate a tomato serum fraction that can suitably be subjected to the filtration in the next process step, the tomato pulp is preferably centrifuged at a relative centrifugal force of at least 200 g, more preferably of at least 500 g. The serum fraction that is obtained by decanting or centrifugation typically contains less than 2 vol. %, preferably less than 1 vol. % of solids.

In the present process the tomato serum fraction is subjected to a filtration step. The serum fraction may be filtered as it is obtained from the preceding isolation step or, alternatively, it may be diluted or concentrated prior to being subjected to the filtration step. Each of these alternatives is encompassed by the present invention.

The filtration of the tomato serum fraction preferably employs a membrane with a MWCO of at most 3000 kDa, more preferably at most 500 kDa, even more preferably of at most 300 kDa, most preferably of at most 200 kDa. By using a membrane with a relatively low MWCO the concentration of small fibres may be decreased and the pectin content of the retentate may be increased.

The retentate that is collected from the filtration typically has a TIS content that is at least 3 times, more preferably at least 4 times higher than the TIS content of the tomato serum fraction.

In accordance with another preferred embodiment, the filtration step employs a membrane that is permeable for particles having a diameter of less than 2 µm, preferably of less than 1.4 µm, most preferably of less than 0.6 µm.

The filtration technique that is employed to filter the tomato serum fraction is preferably selected from ultra filtration, microfiltration and combinations thereof. Filtration of the tomato serum fraction is suitably carried out at a temperature of 20-70° C., more preferably of 40-60° C.

According to a particularly preferred embodiment, the collected retentate or the dried retentate is combined with another tomato derived fraction, especially the tomato derived fraction that is obtained as a high solids fraction during isolation step b), said high solids fraction having a TIS content of at least 30%, preferably at least 50%, more preferably at least 70% by weight of dry matter. The inventors have found that the blend thus obtained has excellent thickening properties. Although the inventors do not wish to be bound by theory it is believed that the aforementioned high solids fraction contributes tomato fibres that favourable influence the thickening properties of the thickening agent. The inventors have discovered that the blend of retentate and high solids fraction can advantageously be employed as an anti-syneresis agent in tomato-based products, especially ketchup.

The collected retentate, optionally after having been combined with the aforementioned high solids fraction, is preferably dried to a water content of less than 20 wt. %. More preferably, the collected retentate is dried to a water content of less than 10 wt. %, most preferably less than 8 wt. %. The collected retentate may suitably, optionally together with the high solids fraction, be dried by any drying techniques known in the art, including spray drying, drum drying and freeze drying. Preferably, the collected retentate is dried to produce a free flowing powder having a mass weighted average diameter in the range of 10-300 µm, preferably in the range of 15-150 µm.

A further aspect of the invention relates to a method of preparing a food product having a water content of preferably at least 20 wt. %, more preferably at least 30 wt. %, most preferably at least 40 wt. %, said process comprising the step of incorporating 0.01-20%, preferably 0.1-2% of the above described tomato-derived thickening agent in the food product as defined herein before. Preferably, the thickening agent is employed in the preparation of water-continuous food products. Examples of food products in which the thickening agent may advantageously be employed include: ketchup, sauces, juices, dressings, jam and jellies. Preferably, the food products are selected from ketchup, a tomato based sauce, a pizza sauce, tomato soup and tomato juice. More preferably, the food product is ketchup.

Yet another aspect of the invention relates to a tomato ketchup product obtainable by a process that comprises incorporating into said ketchup 0.01-2 wt. % of a tomato-derived thickening agent as defined herein before, said ketchup product containing no added thickening agents of non-tomato origin, said product containing at least 0.5 wt. % of tomato pectin and further being characterised by a Brix value of not more than 34° and a Bostwick value of at most 6.5 cm/30 s. The tomato-derived thickening agent of the present invention enables the preparation of ketchup products that do not contain non-tomato derived thickening agents but that in terms of rheological properties are indistinguishable from conventional ketchup products that contain added thickening agents such as natural gums, starch, guar gum, xanthan gum, CMC and non-tomato derived pectin.

Preferably, the tomato ketchup of the present invention contains 0.4-0.6 wt. % tomato pectin. The Brix value of the tomato ketchup advantageously lies within the range of 28 to 34. Typically, the Bostwick value of the present ketchup product lies within the range of 3-6.5 cm/30 s, most preferably in the range of 3-4.5 cm/30 s.

In accordance with a particularly preferred embodiment, the present ketchup product is obtainable by the preparation method described herein before, said ketchup further being characterised in that it does not contain non-tomato derived thickening agents. Even more preferably, the ketchup product is 100% tomato derived.

The latter ketchup product typically contains at most 8 NTSS, more preferably at most 7 NTSS and most preferably at most 6 NTSS.

The pectin content of the ketchup product preferably is at least 0.8% by weight of dry matter. More preferably, said pectin content is at least 1.0% and most preferably at least 1.5% by weight of dry matter.

The ketchup product of the present invention is further characterised by elevated levels of tomato protein. Typically, the ketchup product contains at least 2.5% of tomato protein by weight of dry matter. Even more preferably, the ketchup contains at least 2.8% of tomato protein by weight of dry matter.

The invention is further illustrated by means of the following non-limiting examples.

EXAMPLES

Quantitative Analysis of Pectin (AOAC Official Surplus Method 924.09i)

Transfer 200 mL aliquot prepd soln, 920.149(b) or (c), to beaker, add 8-12 g sucrose (2 or 3 lumps cube sugar) if soln does not already contain sugar, and evap. to ca 25 mL. If org. acids are to be detd in filtrate from pectin, cool, add 3 mL 1N $H_2SO_4$, and immediately add 200 mL alcohol with constant stirring. Let ppt settle, filter on 15 cm qual. paper, and wash with alcohol. If org. acids are not to be detd, omit addn of $H_2SO_4$ Transfer ppt to original beaker with hot $H_2O$, evap. To ca 40 mL, and cool to ≤25°. If $H_2O$-insol. matter seps during evapn, stir vigorously, and if necessary add few drops HCl (2+5), and warm; then cool again. Dil. 2-5 mL 10% NaOH soln, depending on vol. ppt, to 50 mL, and ad to soln of alcohol ppt. Let stand 15 min, add 40 mL $H_2O$ and 10 mL HCl (2+5), and boil 5 min. Filter and wash ppt of pectic acid with hot $H_2O$. (This filtration should be rapid and filtrate clear. If filtrate is cloudy or of colloidal nature, reject detn. Colloidal filtrates are due to insufficient alkali or to saponification at too high temp., or both. In such cases, repeat detn, using more alkali and keeping temp. low.)

Wash ppt of pectic acid back into beaker, adjust to vol. of 40 mL, cool to <25°, and repeat saponification with dil. NaOH soln, pptn with dil. HCl, and boiling as above. Again filter and wash ppt of pectic acid with hot $H_2O$, but only to point where test of filtrate shows negligible amount of acid. (≤500 mL total filtrate should be necessary.) Wash pectic acid into Pt dish; dry on steam bath and finally in oven at 100° to constant wt. Weigh, ingnite, and reweigh. Loss in wt=pectic acid.

References: JAOAC 8, 129(1924); 21, 502(1938); 35; 872(1952).

Determination of Natural Tomato Soluble Solids (NTSS)

Natural tomato soluble solids (NTSS) is defined as the reading obtained on a refractometer at 20° C., expressed in terms of percent sucrose, of the clear serum obtained from a tomato product containing no added salt and/or sugars. This reading may be obtained directly from the sugar scale of a refractometer or may be derived from the refractive index by reference to Table 970.91 (AOAC Methods of Analysis, Vol. II, 15th Ed.) as cited in 42.1.10, Solids in Tomato Products (AOAC Methods of Analysis, Vol. II, 16th Ed.).

Example 1

Aseptically packed tomato paste was mixed with water for produce a pulp with a total solids content of 7 wt. %. The tomato pulp was separated into serum and sediment (high solids fraction) in a centrifuge that was operated at a revolution speed of 4000 rpm. The tomato serum so obtained represented 85 wt. % of the tomato pulp feed and contained less than 1 vol. % of insoluble solids. The tomato serum was fed to a micro filtration unit with a ceramic membrane of 1.4 microns pore size (~14,000 kDa).

Both the retentate and the high solid fraction obtained from this unit were dried to a moisture content of approximately 5 wt. % using a spray drier.

Lycopene, protein, pectin and sugar contents of the dried retentate, the dried high solids fraction and the tomato paste were determined. Also the total solids content, Brix level, TIS, TSS and the particle size distributions were determined. The results are shown in Table 1.

TABLE 1

|  | Retentate | High solids fraction | Tomato Paste |
| --- | --- | --- | --- |
| ° Brix | 54.90 | 10.10 | 29.24 |
| % Total Solids | 88.88 | 92.31 | 33.18 |
| % TSS | 13.54 | 0.86 | 27.61 |
| % TIS | 75.34 | 91.45 | 5.57 |
| Lycopene [mg/100 g] | 455.77 | 1.58 | 50.23 |
| Protein [g/100 g] | 21.40 | 11.85 | 2.53 |
| Pectin [g/100 g] | 19.19 | 4.26 | 1.46 |
| Sugars [g/100 g] | 24.00 | 5.80 | 17.80 |
| 10% of the particle size | ≤5.91 μm | ≤28.44 μm | ≤128.01 μm |
| 50% of the particle size | ≤24.76 μm | ≤86.67 μm | ≤314.14 μm |
| 90% of the particle size | ≤72.15 μm | ≤320.06 μm | ≤658.07 μm |

Example 2

Ketchup products were prepared on the basis of a standard recipe and recipe (reference) in accordance with the present invention (recipe 1). Both recipes are shown in Table 2.

TABLE 2

|  | Reference | Recipe 1 |
| --- | --- | --- |
| Aqueous phase (sugar, condiments etc.) | 75.58 | 75.16 |
| Tomato paste | 24.14 | 24.14 |
| Xanthan gum | 0.08 |  |
| Carboxy methyl cellulose | 0.13 |  |
| Pectin | 0.06 |  |
| Calcium chloride | 0.01 |  |
| Dried retentate from Example 1 |  | 0.50 |
| Dried high solids fraction from Example 1 |  | 0.20 |

Physical analysis showed that the water binding capacity and consistency of both ketchups were essentially identical.

Chemical analysis of the two ketchup products produced the date presented in Table 3.

TABLE 3

|  | Reference | Recipe 1 |
| --- | --- | --- |
| ° Brix | 32.82 | 33.50 |
| % Total Solids | 33.20 | 34.09 |
| % TSS | 6.67 | 6.73 |
| % TIS | 1.34 | 1.90 |
| Lycopene [mg/100 g] | 13.18 | 16.21 |
| Protein [g/100 g] | 0.65 | 1.04 |
| Pectin [g/100 g] | 0.45 | 0.55 |
| Sugars [g/100 g] | 25.10 | 25.50 |

These results show that the tomato-derived thickening agent of the present invention can suitably be used instead of a number of additives (xanthan gum, CMC, pectin, $CaCl_2$) to provide the same functionality, notably water binding capacity, in an aqueous food product.

Example 3

Ketchup products were prepared on the basis of a standard recipe and recipe (reference) in accordance with the present invention (recipe 1). Both recipes are shown in Table 4.

TABLE 4

|  | Reference | Recipe 1 |
| --- | --- | --- |
| Aqueous phase (condiments etc.) | 75.58 | 75.46 |
| Tomato paste | 24.14 | 24.14 |
| Xanthan gum | 0.08 |  |
| Carboxy methyl cellulose | 0.13 |  |
| Pectin | 0.06 |  |
| Calcium chloride | 0.01 |  |
| Dried retentate from Example 1 |  | 0.40 |

Physical analysis showed that the water binding capacity and consistency of both ketchups were essentially identical, shown in Table 5.

TABLE 5

|  | Reference | Recipe 1 |
| --- | --- | --- |
| ° Brix | 33.25 | 31.91 |
| % TSS | 6.67 | 6.72 |
| % TIS | 1.34 | 1.65 |
| Bostwick [cm/30 s] | 3.3 | 4.2 |
| Blotter [mm/30 min] | 1.7 | 2.0 |

Where Bostwick is a measurement of consistency (higher value means lower consistency) and Blotter a measurement of water binding capacity (higher value means lower capacity).

These results show that the tomato-derived thickening agent of the present invention can suitably be used instead of a number of additives (xanthan gum, CMC, pectin, CaCl₂) to provide the same functionality, notably water binding capacity, in an aqueous food product.

Example 4

Aseptically packed tomato paste was mixed with water to produce a pulp with a soluble solids content of 4° Brix and a total solids content of 4.6 wt. %. The tomato pulp was separated into serum and cake (high solids fraction) using a filter-press. This is a filter containing 3 filtering bodies, with a spacing of 15 mm. The juice was pumped through the filters (#263) with a pressure of 10 bar and the fibres that did not pass the filter formed a cake.

The tomato serum so obtained represented 83.2 wt. % of the tomato pulp feed and contained a total solids content of 3.0 wt. %. The formed cake had a total solids content of 12.7 wt. %.

Example 5

Example 4 was repeated, except that this time a filter-press containing a diaphragm was used. This diaphragm is situated in the spacer which, after the standard filtration (as described above), is inflated pressing the cake against the filter and by this means pressing more liquid through the filter. For this process a more open filter needs to be used (#272).

The tomato paste was diluted to a solids content of 5.0 wt. %. The serum so obtained represented 79.0 wt. % of the tomato pulp feed and contained a total solids content of 1.9 wt. %. The formed cake had a total solids content of 16.8 wt. %

Example 6

Aseptically packed tomato paste was mixed with water to produce a pulp with a total solids content of 5 wt. %. The tomato pulp was separated into serum and sediment (high solids fraction) in a decanter that was operated at a revolution speed of 5000 rpm. The clarified juice so obtained was passed a second time through the decanter to obtain a serum containing less than 1 vol. % of solids, this serum represented 90 wt. % of the tomato pulp feed. The tomato serum was fed to an ultra filtration unit with a fluoro-polymer membrane having a MWCO of 20 kDa. The retentate so obtained had a much higher content of small fibres than the retentate of Example 1.

The total solids content, amino acid-, lycopene-, pectin- and sugar contents of the retentate, the permeate and the serum were determined. The results are shown in Table 6.

TABLE 6

|  | Retentate | Permeate | Serum |
| --- | --- | --- | --- |
| % Total Solids | 6.43 | 4.00 | 4.53 |
| Amino acids | 1.00 | 0.54 | 0.77 |
| Lycopene [mg/100 g] | 21.11 | n.d. | 3.46 |
| Pectin [mg/100 g] | 1320 | 13 | 330 |
| Sugars [g/100 g] | 2.82 | 2.61 | 2.83 | n.d. = not detected

Example 7

The same tomato serum as described in Example 6 was also fed to an ultra filtration unit with a polyvinylidene difluoride membrane having a MWCO of 200 kDa. Also this retentate had a substantially higher content of small fibres than the retentate of Example 1.

The total solids content, amino acid-, lycopene-, pectin- and sugar contents of the retentate, the permeate and the serum were determined. The results are shown in Table 7.

TABLE 7

|  | Retentate | Permeate | Serum |
| --- | --- | --- | --- |
| % Total Solids | 6.55 | 4.11 | 4.94 |
| Amino acids | 1.06 | 0.50 | 0.79 |
| Lycopene [mg/100 g] | 20.43 | n.d. | 3.1 |
| Pectin [mg/100 g] | 1420 | 6 | 360 |
| Sugars [g/100 g] | 3.01 | 2.49 | 2.99 | n.d. = not detected

The invention claimed is:

1. A process for preparing a tomato-derived thickening agent comprising the steps of:
   a. providing a tomato pulp containing 3-15 wt. % tomato soluble solids (TSS) and 0.3-5 wt. % tomato insoluble solids (TIS);
   b. isolating from said tomato pulp a tomato serum fraction having a reduced TIS content of less than 2.0 wt. % and a TSS content of at least 3 wt. %;
   c. subjecting said tomato serum fraction to a filtration step to produce a retentate and a filtrate, said filtration step employing a membrane with a molecular weight cut-off (MWCO) in the range of 10-20,000 kDa;
   d. collecting the retentate; and
   e. drying the retentate to obtain the tomato-derived thickening agent.

2. The process according to claim 1, wherein the tomato serum fraction is isolated from the tomato pulp by means of a solid-liquid separation technique selected from centrifugation, decanting, sieving, filtration and combinations thereof.

3. The process according to claim 1, wherein the dried retentate is combined with another tomato derived fraction that is obtained as a high solids fraction during isolation step b), said high solids fraction having a TIS content of at least 50% of by weight of dry matter.

4. The process according to claim 3, wherein the high solids fractions has a TIS content of at least 70% of by weight of dry matter.

5. The process according to claim 1, wherein the tomato pulp comprises one or more tomato materials selected from tomato paste, tomato puree, and tomato juice.

6. The process according to claim 5, wherein the tomato pulp is tomato paste and/or tomato puree diluted with water.

7. The process according to claim 1, wherein the dried retentate is dried to a water content of less than 20 wt. %.

8. The process according to claim 1, wherein the retentate is dried to produce a free-flowing powder having a mass weighted average diameter in the range of 10-300 μm.

9. The process according to claim 1, wherein the serum fraction is diluted or concentrated prior to being subjected to step c).

* * * * *